May 18, 1965   A. VESS ET AL   3,183,814
CAMERA EXPOSURE CONTROL
Filed March 27, 1963

United States Patent Office 3,183,814
Patented May 18, 1965

3,183,814
CAMERA EXPOSURE CONTROL
Albert Vess, Hanson, and Daniel E. Phipps and Jean L. Hunerwadel, Braintree, Mass., assignors to Keystone Camera Company, Inc., Boston, Mass., a corporation of Massachusetts
Filed Mar. 27, 1963, Ser. No. 268,248
14 Claims. (Cl. 95—64)

This invention relates to photographic cameras and more particularly to an improved exposure control mechanism for use with diaphragms that are automatically controlled to respond to changes in incident light.

It is desirable in motion picture cameras to automatically regulate the size of the diaphragm opening as a function of the brightness of the scene that is to be photographed. In such systems a light sensitive device such as a photocell senses the light from the scene to be photographed and energizes a galvanometer to position a diaphragm mechanism relative to the lens system as a function of the sensed light so that the size of the diaphragm opening is decreased as the sensed light increases. One or more movable diaphragm elements may be employed to control the size of the opening in this manner, as for example, a single diaphragm vane with a tapered aperture therein. However, at small diaphragm openings edge effects produce noticeable and objectionable diffraction, particularly where the aperture is narrow and elongated.

Two known arrangements proposed to reduce the objectionable diffraction effects modify the diaphragm opening and insert in the movable member a filter member either of uniform or graduated density. However, such arrangements are substantially more expensive as additional steps are required in the manufacture of the vane and the assembly of the vane and filter components must be precisely coordinated. It is essential that the filter be accurately dimensioned and be of minimal thickness, and also be precisely positioned normal to the optical axis so that the distortions it introduces are negligible. Also, the filter must be stable, both in dimension and in transmission characteristics over the life of the camera while not imposing an adverse loading effect on the delicate galvanometer vane drive mechanism. These conditions have been found difficult to meet satisfactorily in a movable diaphragm mounting.

Accordingly, an object of this invention is to provide a novel and improved exposure control apparatus for cameras which provides reduced diffraction error at small lens openings.

Another object of the invention is to provide an exposure control apparatus for use in cameras which employ light sensitive diaphragm drive mechanisms and a diffraction compensation filter cooperating with the diaphragm vane but mounted independently thereof to provide a continuously variable exposure control apparatus.

Other objects, features and advantages of the invention will be seen as the following description of a preferred embodiment thereof progresses, in conjunction with the drawing, in which.

Figure 1:
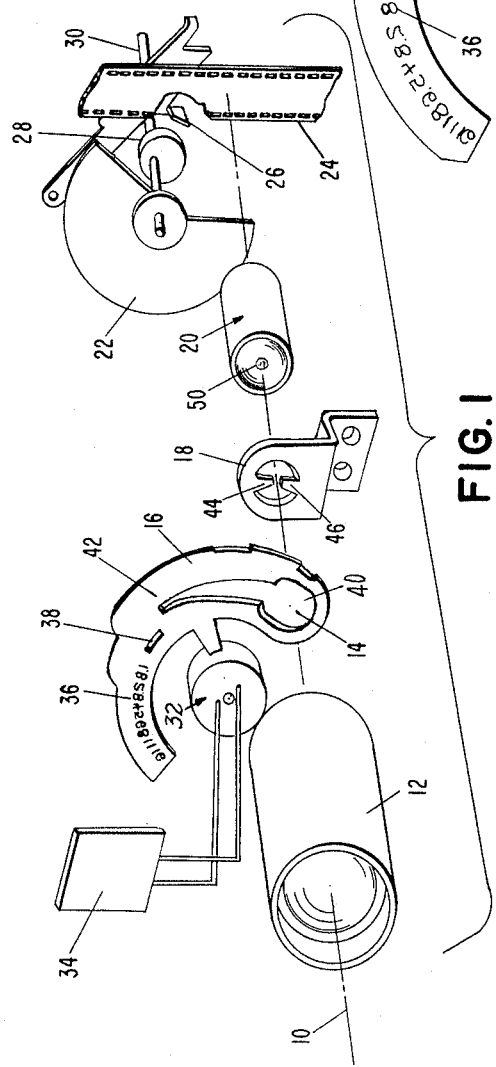
FIG. 1 is a diagrammatic exploded isometric view of a camera embodying the invention.

With reference to FIG. 1, a typical camera which might employ the invention has an optical axis 10 on which are arranged a first lens system 12, the aperture 14 of a movable vane 16, a fixed vane structure 18, a second lens system 20, a shutter 22, and a photosensitive surface such as film strip 24. The film strip 24 in a motion picture camera is advanced by a claw mechanism 26 actuated by cam 28 which is rotated by shaft 30. Shutter 22 is also rotated by shaft 30 in coordinated operation with the film advancing claw 26.

The movable diaphragm vane 16 is attached to a galvanometer structure 32 which is energized by a suitable light sensor such as photocell 34. Photocell 34 is exposed for illumination by the scene lighting at which the lens system 12 is directed and causes the galvanometer 32 to rotate the movable vane 16 to a diaphragm position as a function of scene brightness so that the aperture 14 controls the amount of light impinging on the photosensitive surface.

The movable vane 16 includes an etched series of diaphragm opening indications 36 which are aligned for display in a viewfinder so that the operator of the camera may have direct indication of the diaphragm opening. Aperture 38 when aligned with the viewfinder provides a sharply increased amount of light, indicating to the operator that there is insufficient light available for normal picture taking operations. The vane aperture 14 is formed at one end in a bulge 40 for maximum light path dimensions and tapers to a vertex 42.

The movable vane structure cooperates with the fixed vane structure which has two tabs 44, 46 extending towards the optical axis 10 from either side thereof and cooperate with aperture 14 to define the boundaries of the light transmitting path to the photosensitive element 24. While these tabs preferably are fixed in place, it is understood that if desired these tabs may be movable, as for example to increase the dimensions of the light transmitting path at maximum diaphragm openings.

Figure 2:
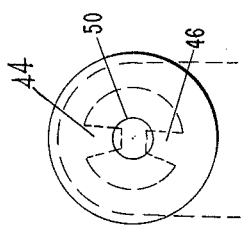
FIG. 2 is a diagrammatic view illustrating the relation of the lens system and fixed diaphragm element in the preferred embodiment of the invention.
Figure 3:
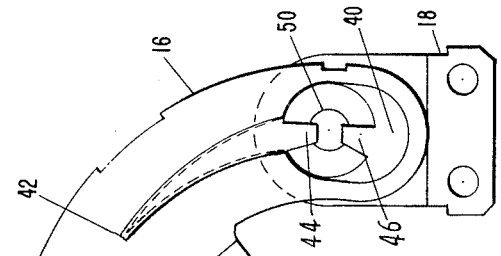
FIG. 3 is a diagram indicating in greater detail the relation of the movable vane to the lens and fixed vane structure of the camera shown in FIG. 1.

Also cooperating with the vane structures to modify the light path along the optical axis of the camera is a neutral density element 50 that is deposited directly on the surface of the first lens of the second lens unit 20. Where this lens is rotatable, as for example for focusing purposes, the density element 50 should be circular in configuration and coaxial with the optical axis. Preferably, the density element 50 overlaps the fixed vane tabs 44, 46, as shown in FIGS. 2 and 3. In a camera lens system employing a 13 millimeter F1.8 lens, a density spot 0.092" in diameter of 0.61 density produces satisfactory results. The spot is preferably neutral in color so that no change in characteristics of the light passing along the optical axis is introduced. This density element 50 may be a multilayer coating of a chromium-nickel alloy (Inconel) or other suitable coating material that is deposited on the front surface of the lens by metal evaporation in a vacuum with its configuration being determined by a suitable mask. Although circular density elements, as shown, are satisfactory, the element configuration may be modified either with changes in shape or tapered density, or both, with corresponding modification in the size and shape of the diaphragm vane aperture employed in the particular camera. The light transmission control element is of greater density at the optical axis than the peripheral portions of the optical path, and when a uniform density filter element is employed, its area should be less than 50% of the cross sectional area of the optical path at that point.

With an 0.61 uniform density spot .092" in diameter on a 13 millimeter f1.8 lens, the light transmission is reduced only about 5% at full lens opening, while at f11 opening the light transmission is cut about 60% so that the f11 vane configuration produces approximately an equivalent f18 light transmission. This larger diaphragm opening creates substantially less diffraction distortion due to the greater distance between the vane edges at that $f$ value.

The modified configuration of the aperture 14 as permitted by the density element 50 is contrasted in FIG. 3 with a vane configuration (shown in dotted line) employed in a camera without a filter element. It will be noted that the width of the modified vane at the f22 stop adjacent the vertex 42 is twice the dimension of the unmodified vane and that the vane aperture dimensions taper toward the dimensions of the unmodified vane aperture in a uniform transition to the large end or bulge 40 where they are of substantially the same configuration. Thus, this exposure control arrangement reduces substantially the distortion introduced due to edge effect at small aperture openings without requiring the use of a larger lens system.

While a preferred embodiment of the invention has been shown and described, various modifications thereof will be obvious to those skilled in the art and therefore the invention is not intended to be limited to the disclosed embodiment or to details thereof and departures may be made therefrom within the spirit and scope of the invention as defined in the claims.

What is claimed is:

1. A photographic camera comprising a lens system defining an optical axis for focusing an image of a viewed scene onto a photosensitive surface,
   a diaphragm controlling the dimensions of the light path along said optical axis,
   a light sensitive element disposed for illumination by light from said scene,
   a diaphragm drive means responsive to said light sensitive element for moving said diaphragm to adjust the dimensions of said light path as a function of the scene brightness sensed by said light sensitive element between a position of maximum dimension and a position of minimum dimension,
   and a density element fixed in location on said optical axis and cooperating with said diaphragm for limiting the transmission of light from said scene to said photosensitive surface,
   said density element having an area less than one half the area of said light path as established by said maximum dimension of said diaphragm.

2. The camera as claimed in claim 1 wherein said density element is a film of material deposited on the surface of one of the elements of said lens system.

3. The camera as claimed in claim 1 and further including a fixed vane structure cooperating with said diaphragm to define the dimensions of said light path,
   said fixed van structure including a tab which extends inwardly toward said optical axis from the periphery of said light path,
   and said density element overlying, at least in part, said tab.

4. In a photographic camera having means defining an optical axis for focusing an image of a viewed scene onto a photosensitive surface,
   the combination comprising:
   an exposure meter having a light sensitive member disposed for illumination by light from said scene and having an output member moved under control of said light sensitive member to any of a plurality of positions as a function of the brightness of said scene,
   at least one diaphragm vane coupled to said output member and having an elongated aperture movable relative to said focusing means in response to movement of said output member for regulating the emission of said scene light to said photosensitive surface,
   and a density element fixed in location on said optical axis coaxially therewith cooperating with said diaphragm vane for limiting the illumination of said photosensitive surface by scene light,
   said density element having an area less than one half the area of said light path as established by said maximum dimension of said diaphragm.

5. In a photographic camera having means defining an optical axis for focusing an image of a viewed scene onto a photosensitive surface,
   the combination comprising:
   an exposure meter having a light sensitive member disposed for illumination by light from said scene and having an output member moved under control of said light sensitive member to any of a plurality of positions as a function of the brightness of said scene,
   at least one diaphragm vane coupled to said output member movable relative to said focusing means in response to movement of said output member for regulating the emission of said scene light to said photosensitive surface,
   and light transmission control means adapted to be fixed in location in the optical path defined by said focusing means and cooperating with said diaphragm vane for limiting the illumination of said photosensitive surface by scene light,
   said light transmission control means having a central portion intersecting the optical axis of said optical path which transmits a lesser amount of light than the peripheral portion of said optical path.

6. The combination as claimed in claim 5 wherein said light transmission control means is a filter element of uniform density.

7. The combination as claimed in claim 5 wherein said light transmission control means is a molecular layer of material deposited directly on a lens element in said focusing means.

8. In a photographic camera, the combination comprising a lens defining an optical axis for focusing an image of a viewed scene onto a photosensitive surface,
   at least one movable diaphragm controlling element defining an aperture and cooperating with said lens for regulating illumination of said photosensitive surface by scene light,
   said element being adjustable between a large aperture opening aligned with said optical axis and a small aperture opening aligned with said optical axis,
   and an optical filter disposed in alignment with the central portion of said lens for attenuating the light transmitted through said central portion of said lens more than the light transmitted through the peripheral portion of said lens,
   said optical filter having a width greater than the width of said small aperture opening.

9. The combination as claimed in claim 8 wherein said filter is a chromatically substantial neutral element.

10. The combination as claimed in claim 8 wherein said filter is deposited directly on the surface of said lens.

11. An exposure control mechanism for a photographic camera comprising at least one diaphragm element having an elongated aperture formed therein operable to define a diaphragm opening,
    said aperture having a portion of generally tapered configuration,
    a lens system defining an optical axis,
    means to move said diaphragm element in a direction perpendicular to said optical axis for regulating the light transmitted through said lens system,
    and an optical filter disposed in alignment with the central portion of said lens for attenuating the light transmitted through said central portion of said lens more than the light transmitted through the peripheral portion of said lens,
    said optical filter having a width greater than the smallest width of said tapered portion.

12. The mechanism as claimed in claim 11 wherein said filter is a chromatically substantial neutral element.

13. The mechanism as claimed in claim 11 wherein said filter is deposited directly on the surface of said lens.

14. In a photographic camera, the combination comprising a lens defining an optical axis for foscusing an image of a viewed scene onto a photosensitive surface,
   at least one movable diaphragm vane,
   said vane having an elongated tapered aperture movably cooperating with said focusing lens for regulating illumination of said photosensitive surface by scene light,
   said aperture having a portion of generally tapered configuration,
   and a chromatically substantial neutral optical filter deposited directly on the central portion of a surface of said lens for attenuating the light transmitted through said central portion of said lens more than the light transmitted through the peripheral portion of said lens.

References Cited by the Examiner
UNITED STATES PATENTS

| | | | |
|---|---|---|---|
| 2,611,294 | 9/52 | Luboshez | 88—57 |
| 2,758,511 | 8/56 | Auwarter | 88—57 |
| 3,006,265 | 10/61 | La Rue | 95—64 |
| 3,033,094 | 5/62 | Stimson et al. | 95—64 |
| 3,043,181 | 7/62 | Brown et al. | 88—57 |
| 3,057,279 | 10/62 | Angenieux | 95—64 |

FOREIGN PATENTS

| | | |
|---|---|---|
| 1,212,381 | 10/59 | France. |
| 867,705 | 5/61 | Great Britain. |

OTHER REFERENCES

German application 1,095,655, Dec. 22, 1960.

NORTON ANSHER, *Primary Examiner.*